United States Patent
Ibaraki et al.

(10) Patent No.: US 7,037,356 B2
(45) Date of Patent: May 2, 2006

(54) METHOD FOR OPERATING ROTARY HEARTH TYPE REDUCING FURNACE AND ROTARY HEARTH TYPE REDUCING FURNACE FACILITIES

(75) Inventors: Tetuharu Ibaraki, Kimitsu (JP); Hiroshi Oda, Kimitsu (JP); Masaharu Takahashi, Kimitsu (JP)

(73) Assignee: Nippon Steel Corporation, Tokyo (JP)

( * ) Notice: Subject to any disclaimer, the term of this patent is extended or adjusted under 35 U.S.C. 154(b) by 198 days.

(21) Appl. No.: 10/416,379

(22) PCT Filed: Nov. 9, 2001

(86) PCT No.: PCT/JP01/09848

§ 371 (c)(1),
(2), (4) Date: May 8, 2003

(87) PCT Pub. No.: WO02/38815

PCT Pub. Date: May 16, 2002

(65) Prior Publication Data

US 2004/0026834 A1    Feb. 12, 2004

(30) Foreign Application Priority Data

Sep. 6, 2001    (JP) .............................. 2001-269797
Sep. 14, 2001    (JP) .............................. 2001-279055
Nov. 10, 2001    (JP) .............................. 2001-342800

(51) Int. Cl.
*C21B 11/00*    (2006.01)

(52) U.S. Cl. .......................................... 75/484; 75/503
(58) Field of Classification Search ................ 75/484, 75/503; 266/173, 171
See application file for complete search history.

(56) References Cited

U.S. PATENT DOCUMENTS 6,284,017 B1 * 9/2001 Kamei et al. .................. 75/484
6,368,104 B1 * 4/2002 Saxena et al. ............... 432/138

FOREIGN PATENT DOCUMENTS

EP    0508166 A    10/1992

(Continued)

OTHER PUBLICATIONS

English language translation of Japanese 11-342314, Koji et al, Dec. 14, 1999.*

(Continued)

*Primary Examiner*—Scott Kastler
(74) *Attorney, Agent, or Firm*—Baker Botts LLP; Chang Sik Kim; Manu J. Tejwani

(57) ABSTRACT

The present invention provides a method of operation and a facility for the same suppressing the generation of dioxins in the combustion exhaust gas and efficiently reclaiming heat from high temperature combustion exhaust gas when firing and reducing fines of chromium ore, iron ore, or other ore or pellets formed from dust sludge, etc. containing iron oxide or other metal oxides generated in the metal industry in a reducing rotary hearth furnace. This treats the combustion gas generated in the reducing rotary hearth furnace to make the temperature of the gas 800° C. or higher for at least a certain time, to make the concentration of the carbon monoxide not more than 200 ppm in terms of volume ratio and to achieve a sufficiently well developed turbulent state at least at one of the inside of the exhaust gas outlet duct and the vicinity of the exhaust gas outlet duct for at least a certain time, then rapidly cooling the gas. Further, it controls the total number of moles of zinc and lead, the total number of moles of alkali metals, and the total number of moles of halogen elements contained in the combustion exhaust gas to a predetermined ratio.

30 Claims, 3 Drawing Sheets

FOREIGN PATENT DOCUMENTS

| | | |
|---|---|---|
| JP | 6-294586 A | 10/1994 |
| JP | 9-014867 A | 1/1997 |
| JP | 11-012627 A | 1/1999 |
| JP | 11-190594 A | 7/1999 |
| JP | 11-244653 A | 9/1999 |
| JP | 11-248359 A | 9/1999 |
| JP | 11-302749 A | 11/1999 |
| JP | 11-325749 A | 11/1999 |
| JP | 11-342314 A | 12/1999 |
| JP | 11342314 A | 12/1999 |
| JP | 2000-054034 | 2/2000 |
| JP | 2000-169906 | 6/2000 |
| JP | 2000-169906 A | 6/2000 |
| JP | 2000-212620 A | 8/2000 |
| JP | 2001-032024 A | 2/2001 |
| JP | 2001-033173 A | 2/2001 |
| WO | WO 97/08347 | 3/1997 |

OTHER PUBLICATIONS

"Aufarbeitung Von Reststoffen Aus 1 Der Stahlindustrie," Stahl Und Eisen, Verlag Stahleisen GMBH., Dusseldorf, DE, vol. 112, No. 8, p. 83-86, no date.

* cited by examiner

METHOD FOR OPERATING ROTARY HEARTH TYPE REDUCING FURNACE AND ROTARY HEARTH TYPE REDUCING FURNACE FACILITIES

CROSS-REFERENCE TO RELATED APPLICATIONS

This application is a national stage application of PCT Application No. PCT/JP01/09848 which was filed on Nov. 9, 2001 and published on May 16, 2002 as International Publication No. WO 02/38815 (the "International Application"), the entire disclosure of which is incorporated herein by reference. This application claims priority from the International Application pursuant to 35 U.S.C. § 365. The present application also claims priority under 35 U.S.C. § 119 from Japanese Patent Application No. 2000-342800, filed on Nov. 10, 2000, Japanese Patent Application No. 2001-269797, filed on Sep. 6, 2001, and Japanese Patent Application No. 2001-279055, filed on Sep. 14, 2001, the entire disclosures of which are incorporated herein by reference.

FIELD OF THE INVENTION

The present invention relates to a method of operation which suppresses the production of dioxins in combustion gas in a reducing furnace, efficiently exchanges heat with and reclaims heat from high temperature combustion exhaust gas, and suitably treats the combustion exhaust gas when heating, firing, and reducing pellets or other shaped articles containing metal oxides in a rotary hearth reducing furnace or other reducing furnace and a facility for the same.

BACKGROUND INFORMATION

There are various types of processes for producing reduced iron or iron alloy. There are the Waelz kiln method of heating and reducing feedstock inside a rotary kiln while tumbling with carbon and a reducing agent, the rotary hearth method of firing and reducing feedstock in a reducing rotary hearth furnace, etc. Among these, as a process with a high productivity, operation is being performed by the rotary hearth method such as shown in Japanese Unexamined Patent Publication (Kokai) No. 200054034. The rotary hearth method is a process based on heating reducing furnace of a type reducing pellets or other shaped articles of a powder feedstock charged on the hearth and moving through a heating zone, reducing zone, and ejector by rotating a disk-shaped hearth of refractories with a cutaway center at a constant speed on rails under a fixed ceiling and side walls made of refractories (hereinafter called a "rotary furnace") and is used for the reduction of metal oxides. The diameter of the hearth of the rotary furnace is 10 to 50 meters, and the width of the hearth is 2 to 6 meters.

As the feedstock, fine ore or metal oxide dust or other metal oxides and carbon serving as a reducing agent are used. In the production of reduced iron, pellet feed ore or other particulate iron ore etc. is used. Carbon is used as the reducing agent, but an agent with a high percentage of carbon not volatilizing up to about 1100° C. at which a reduction reaction takes place, is preferable (hereinafter this carbon is called fixed carbon). For such a carbon source, fine coke or anthracite is preferred.

The powder containing the metal oxides of the feedstock is mixed with an amount of reducing agent containing carbon required for reducing the metal oxides, then is pelletized to form green pellets which are then fed in layers on the hearth of the rotary furnace. The green pellets are spread on the hearth of the rotary furnace. In a rotary furnace, a circular hearth with a cutaway center rotates under a refractory ceiling and side walls. The pellets on the hearth are moved through the several parts of the furnace and heated rapidly. They are fired for 5 minutes to 20 minutes at a high temperature of around 1300° C., whereby the metal oxides are reduced by the carbon in the pellets, and metal is produced. In the rotary furnace, since the green pellets are placed stationarily on the hearth, there is the advantage that the green pellets are resistant to crumbling in the furnace. As a result, there are the strong points that there is no problem of the powderized feedstock sticking on the refractories in the rotary furnace and the yield of pellets is high. Further, this process is being used in many cases in recent years since the productivity is high and it is possible to use an inexpensive coal-based reducing agent or powder feedstock.

Further, the rotary hearth method is also effective for treatment to reduce and remove impurities from the iron-making dust generated from a blast furnace, converter, or electric furnace, or scale or thickener sludge generated from the rolling process. It is also used as a dust treatment process and is a process effective for recycling of metal resources. The fact that when reducing dust, the rotary hearth method is possible to remove zinc, lead, alkali metals, halogens, and other impurities is also an advantage of the rotary hearth method. This is the reason why this is a particularly effective process for recycling of dust etc. generated in the ironmaking industry.

The operation in the rotary hearth method can be summarized as follows. First, the feedstock, that is, the metal oxides such as the fine ore or the dust or sludge are mixed well with an amount of carbonaceous reducing agent required for the reduction of the oxides, then pelletized. There are several methods of pelletization. For example, green pellets of 5 to 20 mm size are produced by a pan type pelletizer or other types of pelletizer to have a moisture content of 8 to 15 wt %. These green pellets are fed onto the rotary hearth in layers and spread over the hearth. The raw pellets spread over the hearth are rapidly heated in the furnace and fired for 5 to 30 minutes at a high temperature of around 1300° C. At this time, the metal oxides are reduced by the carbon of the reducing agent mixed in with the green pellets, thus metal is produced. The amount of fixed carbon in the reducing agent is substantially determined by the amount of oxygen bonded with the metals to be reduced. The metallization ratio after reduction differs depending on the metal to be reduced, but in the case of iron, nickel, or manganese, it is at least 90% and even with the case of chromium, which is hard to be reduced, it is at least 40%.

As explained above, the rotary hearth method is an efficient, good process for reducing the metal oxides at a rotary hearth reducing furnace, in particular the dust, scale, sludge, etc. generated from the industries of refining or processing metals, to obtain reduced metal. When using dust or other by-products of the metal industry as feedstock, this is an effective means in recycling.

The fine ore used as part of the feedstock also includes chlorine or another impurities. In particular the by-products in the metal industry include machine oil, organic matter in water, chemicals with chlorine agents, resin powder, and other impurities. For example, the sludge deposited in a scale pit, which is generated in the process of rolling a steel material, contains 1 to 5 mass % of machine oil. Further, blast furnace dust contains 0.1 to 0.3 mass % of chlorine.

Further, electric furnace dust used for reduction in a reducing rotary hearth furnace also contains chlorine and oil, and in addition, it contains dioxins themselves. Most of these impurities burn or vaporize inside the rotary furnace and are discharged from the furnace. During this process, the organic matter burns and forms carbon dioxide or water vapor. If the combustion is incomplete, however, sometimes soot, carbon, unburned benzene, etc. may be contained in the combustion gas. Further, the chlorine ingredient forms chlorine gas or hydrogen chloride gas or salts such as sodium chloride, zinc chloride, etc. A large concentration of each of the materials is discharged from the furnace together with the combustion gas. These organic substances and chlorine react in the combustion gas and generate dioxins, though the amounts are small. In particular, the generation of dioxins increases when the combustion in the furnace is incomplete. When the concentration of the carbon monoxide in the combustion gas is high, the amount of dioxins generated increases due to the reaction of the chlorine and benzene or a synthesis reaction from the gas phase.

With the conventional facility configuration or method of operation, however, there was not sufficient knowledge and operation was not necessarily performed from the viewpoint of reduction of the generation of dioxins. In conventional operation, the main objective was just simply to supply heat to the reduction reaction. Further, the exhaust gas treatment initially was mainly to prevent deposition of dust in the path of the combustion gas treatment or the reclamation of waste heat. In fact, the methods of reduction of dioxins were not sufficiently reflected in the design of the facilities. In subsequent investigations, it was found that in rotary furnaces since the combustion temperature inside the furnace is higher, the amount of generation of the dioxins is smaller and the environmental load is smaller compared with other combustion processes, but dioxins cannot be totally eliminated in the combustion gas, that is, sometimes, they are present in a concentration of as much as 1 to 5 ng-TEQ/Nm$^3$.

That is, in the operation of a reducing furnace such as a reducing furnace of the rotary hearth method according to the prior art, no good method of operation for effectively controlling the production of dioxins has yet been discovered.

Further, as explained above, a rotary furnace, Waelz kiln, or other reducing furnace generates high temperature combustion exhaust gas containing a large amount of carbon dioxide and water vapor. This combustion exhaust gas is discharged at a rate of 2000 to 3000 Nm3 per ton of feedstock. This exhaust gas contains dust generated from the inside of the furnace, passes through the exhaust gas duct, is cooled by the method of spraying water or by other methods in the exhaust gas treatment apparatus, then is cleaned of dust and emitted into the atmosphere. As explained above, the rotary furnace method is a process with a relatively large amount of generation of dust since the zinc, lead, chlorine, and other impurities are removed by vaporization during the reducing reaction of oxides.

In this way, in the operation of a rotary hearth reducing furnace, rotary kiln, or other metal reducing furnace, a large amount of combustion exhaust gas containing a large amount of dust is generated. The sensible heat held by the exhaust gas corresponds to about 30% of the total input energy. Reclamation of the heat of the combustion exhaust gas plays an important role in operation with a good heat efficiency.

However, when trying to reclaim waste heat of high temperature combustion exhaust gas, there were the problems that the dust strongly stuck to the heat transmission surfaces of the waste heat boiler or heat exchanger, or corroded the metal of these surfaces. As a result, for example in the exhaust gas treatment method in a reducing furnace, as shown in Japanese Unexamined Patent Publication (Kokai) No. 2000-169906, even in the prior art, a method of suitably controlling the temperature of the boiler or heat exchanger was adopted to prevent the deposition of dust. This method is an effective means for treatment of exhaust gas, but depending on the ingredients of the dust, there was the problem that dust deposited on the inside surfaces of the heat exchanger and the path of the exhaust gas was clogged within 2 weeks to one month or so. In particular, if lowering the melting point of the dust, the adhesion power of the dust becomes stronger and the problem becomes greater.

The dust generated from a rotary furnace etc. includes not only the carried-over substances of feedstock such as iron oxide, but also large amounts of alkali metals, zinc, lead, or other volatile metals and cationic substances such as chlorine. At the portion of the exhaust gas outlet duct of 600 to 1100° C. or so, the ingredients of the dust are present as vapor. This starts to deposit as a liquid along with a drop in the temperature of the exhaust gas. The ingredients of dust scattered as solids and the liquids form an emulsion with a high viscosity. This sticks to the path of the exhaust gas, so the path becomes narrower and the problem of easy blockage at that portion arises. That is, when installing a heat exchanger so as to reclaim waste heat, the path of the exhaust gas becomes narrower at that portion and blockage easily takes place. A liquid of an alkali metal salt is strongly cohesive and there was also the problem of metal corrosion at the portion where this emulsion stuck.

The method of the above Japanese Unexamined Patent Publication (Kokai) NO. 2000-169906 is a technique effective for the prevention of deposition of dust. In particular, when there is a large amount of alkali metal salts and zinc compounds, deposition could not be sufficiently prevented. In this way, in the prior art, sufficient attention has not been paid to the control of the ingredients of dust in the exhaust gas and the problem of clogging of a heat exchanger for reclamation of the heat of the exhaust gas has not been sufficiently solved.

Due to this, a technology has been sought which solves the above-mentioned problems and decreases the generation of dioxins in combustion exhaust gas discharged from a rotary furnace, rotary kiln, or other metal reducing furnace and efficiently reclaims sensible heat held by this exhaust gas.

All cited references are hereby incorporated herein by reference in their entireties.

SUMMARY OF THE INVENTION

The present invention was made to solve the above problems and has the following as its gist:

A method of operation of a reducing rotary hearth furnace according to an exemplary embodiment of the present invention includes making the combustion gas generated inside a reducing rotary hearth furnace a temperature of 800° C. or higher at least at one of the inside of an exhaust gas outlet duct of the reducing furnace and the vicinity of the exhaust gas outlet duct, then rapidly cooling it, collecting dust, then discharging the result.

A method of operation of a reducing rotary hearth furnace according to another exemplary embodiment of the present invention includes making the combustion gas generated inside a reducing rotary hearth furnace a temperature of 800° C. or higher at least at one of the inside of an exhaust gas outlet duct and the vicinity of the exhaust gas outlet duct, making a concentration of carbon monoxide not more than 200 ppm by volume ratio, making the gas a well developed turbulent state, then rapidly cooling the combustion gas.

A method of operation of a reducing rotary hearth furnace according to still another exemplary embodiment of the present invention includes making the combustion gas generated inside a reducing rotary hearth furnace a temperature of 800° C. or higher for at least 0.9 second at least at one of the inside of an exhaust gas outlet duct and the vicinity of the exhaust gas outlet duct, making a concentration of carbon monoxide not more than 200 ppm by volume ratio, making the gas a turbulent state of a Reynolds number of at least 30,000, then rapidly cooling the combustion gas.

A method of operation of a reducing rotary hearth furnace according to a further exemplary embodiment of the present invention includes making the combustion gas generated inside a reducing rotary furnace a temperature of 800° C. or higher for at least 0.6 second at least at one of the inside of an exhaust gas outlet duct and the vicinity of the exhaust gas outlet duct, making a concentration of carbon monoxide not more than 60 ppm by volume ratio, making the gas a turbulent state of a Reynolds number of at least 50,000, then rapidly cooling the combustion gas.

A method of operation of a reducing rotary hearth furnace is also described, in which the combustion gas generated in the furnace has a temperature inside the furnace of at least 1200° C. and a molar ratio of carbon monoxide to carbon dioxide of at least 0.1.

A method of operation of a reducing rotary hearth furnace is also described, in which the combustion gas generated inside is cooled from 800° C. or higher to not more than 300° C. within 6 seconds.

In another exemplary method of operation of a reducing rotary hearth furnace, the combustion gas generated inside is cooled in an exhaust gas treatment apparatus provided with any one of a waste heat boiler, water sprayer, and heat exchanger with air alone or in combination.

A method of operation of a reducing rotary hearth furnace is also described, in which the total number of moles A of zinc and lead, the total number of moles B of sodium and potassium, and the total number of moles C of chlorine and fluorine contained in the dust of the combustion gas generated inside satisfy the relationship of $(C-B)/A<0.36$.

A method of operation of a reducing rotary hearth furnace is also described, in which the percent content of compounds of sodium or potassium and chlorine or fluorine contained in the dust of the combustion gas generated inside is not more than 35 mass %.

A method of operation of a rotary hearth reducing furnace is also described, in which the temperature of the combustion gas generated inside is cooled from 800° C. or higher to 550° C. or lower within 5 seconds.

A method of operation of reducing rotary furnace Is further provided In which a combustion exhaust gas is cooled in a gas treatment apparatus provided with at least a preheating type heat exchanger preheating air by heat exchanging, said method characterized In that the total number of moles A of zinc and lead, the total number of mobs B of sodium and potassium, and the total number of moles of C of chlorine and fluorine contained in the dust of the combustion gas generated inside satisfy the relationship of $(C-B)/A<0.36$.

A method of operation of a reducing rotary hearth furnace Is also described, In which the content ratio of compounds of sodium or potassium and chlorine or fluorine contained In the dust of the combustion gas generated inside is not more than 35 mass %.

A method of operation of a reducing rotary hearth furnace is also described, In which the temperature of the exhaust gas at the inlet of the exhaust gas outlet duct of the reducing furnace is 800° C. or higher and the temperature of the exhaust gas at the inlet of the air preheating type heat exchanger of the exhaust gas treatment apparatus is 550° C. or lower.

A method of operation of a reducing rotary hearth furnace Is further provided to include cooling the temperature of the exhaust gas from 800° C. or higher to 550° C. or lower within 5 seconds.

According to yet another exemplary embodiment of the present invention, a method of operation is provided for a reducing rotary hearth furnace for firing and reducing a feedstock obtained by shaping a powder containing a metal oxide and carbon and cooling the combustion exhaust gas in a reducing rotary hearth furnace having an exhaust gas treatment apparatus provided with at least an air preheating type heat exchanger, the method of operation of a rotary hearth reducing furnace such that the relationship of $(0.8C'-0.7B')/A'<0.36$ stands among the total number of moles A' of zinc and lead, the total number of moles 5' of sodium and potassium, and the total number of moles C' of chlorine and fluorine in the feedstock, the temperature of the exhaust gas at the exhaust gas outlet duct of the reducing furnace is made 800° C. or higher, and the temperature of the exhaust gas at the inlet of the air preheating type heat exchanger is made at least 550° C.

A method of operation of a reducing rotary hearth furnace described above and below also provides that the cooled combustion gas generated inside the furnace is cleaned of dust by a bag filter of an exhaust gas treatment apparatus.

A reducing rotary hearth furnace facility according to the present invention can be provided with a reducing furnace for a metal oxide having a rotary hearth and an exhaust gas treatment apparatus comprised of a cooler comprised of a waste heat boiler, water sprayer, or air preheating heat exchanger alone or in combination and a dust collector and by connecting the reducing furnace and the exhaust gas treatment apparatus by a duct having a length of at least 0.9 second converted to time of passage of the combustion gas generated inside the reducing furnace and a product of the inside diameter and flow rate of gas inside at least 7.2 m²/sec.

According to still another embodiment of the present invention, the reducing rotary hearth furnace facility can be provided with a reducing furnace for a metal oxide having a rotary hearth and an exhaust gas treatment apparatus comprised of a cooler comprised of a waste heat boiler, water sprayer, or air preheating heat exchanger alone or in combination and a dust collector, and by connecting the reducing furnace and the exhaust gas treatment apparatus by a duct having a length of at least 0.6 second converted to time of passage of the combustion gas generated inside the reducing furnace and a product of the inside diameter and flow rate of gas inside at least 12 m²/sec.

The reducing rotary hearth furnace facility can also be provided such that the cooler in the exhaust gas treatment apparatus has an inside capacity of the portion cooling the combustion gas from 800° C. or higher to not higher than 300° C. or not more than six times the amount of flow of combustion gas per second.

The reducing rotary hearth furnace facility can also be provided with a reducing furnace for a metal oxide having a rotary hearth and an exhaust gas treatment apparatus comprised of a cooler comprised of a waste heat boiler, water sprayer, or air preheating heat exchanger alone or in combination and a dust collector and by being provided with a means for removing dust deposited on the air preheating heat exchanger of the exhaust gas treatment apparatus of at least one of an impact/vibration imparting device, gas blower, and scraper.

DETAILED DESCRIPTION

Figure 1:
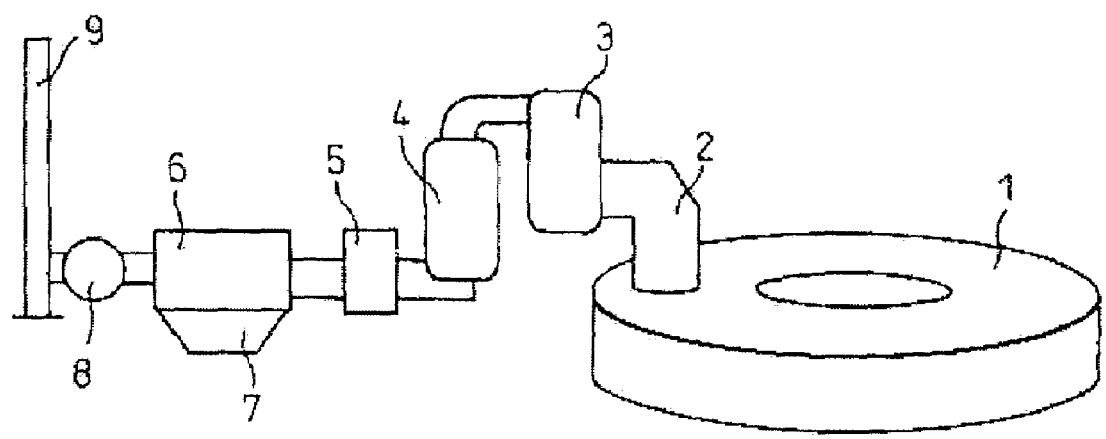
FIG. 1 is a view of an example of the configuration of a reducing rotary hearth furnace facility having a reducing rotary hearth furnace and an exhaust gas treatment apparatus for working the present invention.
Figure 2:
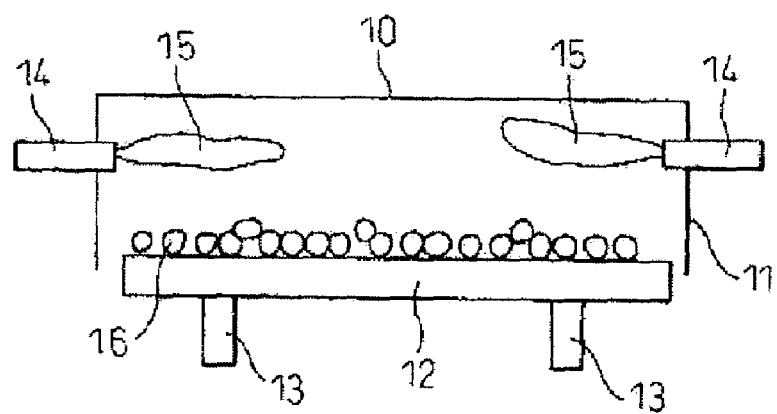
FIG. 2 is a view of a cross-section of a reducing rotary hearth furnace.
Figure 3:
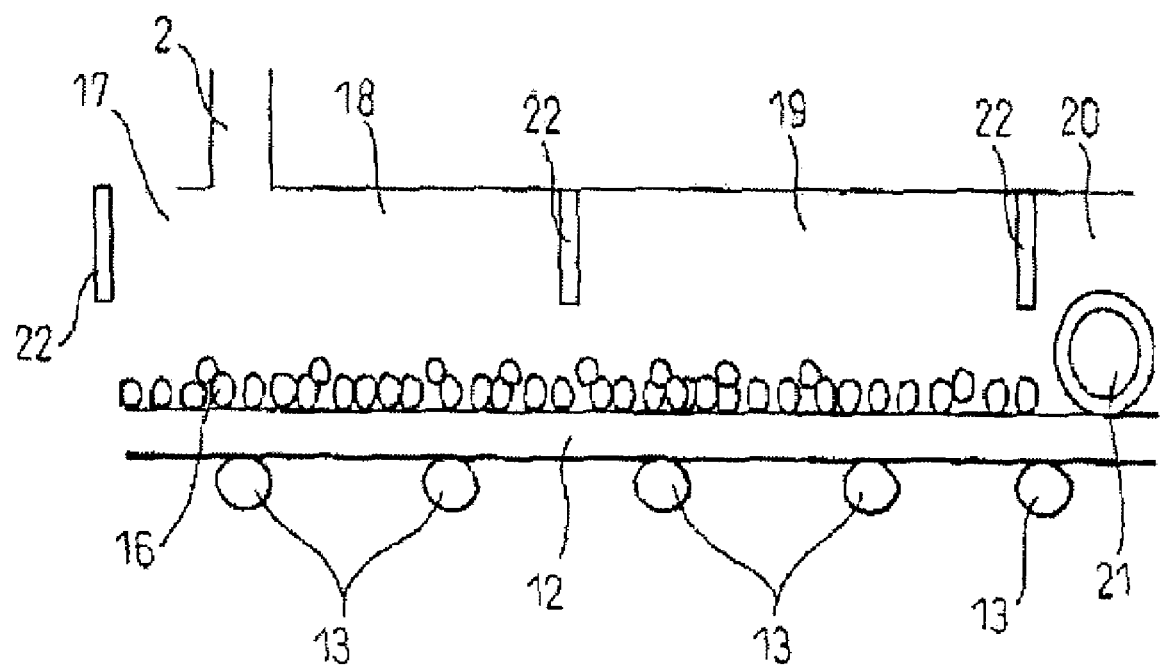
FIG. 3 is a view of a reducing rotary hearth furnace laid out in the circumferential direction.

The present invention will be explained with reference to a reducing furnace of a rotary hearth type shown in FIG. 1 as an embodiment of a reducing furnace arrangement. The arrangement used for performing the process according to the present invention as shown in FIG. 1 is may include a reducing rotary hearth furnace I, a waste heat boiler 3, a water sprayer 4, a heat exchanger (air preheater) 5, and a dust collector 7. The views showing the structure of the rotary furnace are FIG. 2 and FIG. 3. A cross-section view of a reducing furnace is shown in FIG. 2. Further, a view of a disk-shaped hearth with a center cut away inside the furnace laid out in the rotational direction is shown in FIG. 3.

The structure of the reducing furnace 1, as shown in the cross-section of FIG. 2, consists of a hearth 12 moving and rotating on wheels 13 under a fixed ceiling 10 and walls 11 made of refractories. The walls 11 are provided with burners 14. These blow fuel and generate high temperature combustion gas by flames 15. Green pellets 16 comprised of metal oxide powder and carbon powder are spread over the hearth 12. Details of the heating and reduction of the green pellets 16 and other operations will be explained by FIG. 3 of the rotary furnace 1 laid out in the circumferential direction.

The green pellets as a feedstock are formed by mixing fine ore or by-products of ironmaking such as converter gas dust or scale etc. and powder of reducing agent containing carbon and by shaping the mixture such as powder coke etc. The green pellets of this feedstock are spread over the hearth 12 from a feedstock inlet 17. Normally, the thickness is one to three layers. The hearth 12 moves and rotates. Along with this the green pellets 16, first, enter the heating zone 18. The ceiling of the heating zone 18 is connected to an exhaust gas outlet duct 2. The green pellets 16 heated there enter the reducing zone 19 with a higher concentration of carbon monoxide and hydrogen and a high temperature. There, the metal oxides inside the green pellets 16 react with the carbon and are reduced to metals. Next, the reduced green pellets 16 are discharged from the furnace by an discharging screw 21 of the reduced pellet ejector 20. The combustion gas flows in a direction opposite to the pellets, that is, from the high temperature reducing zone 19 to the relatively low temperature heating zone 18, where it is discharged through the exhaust gas outlet duct 2 to the outside of the furnace. Note that while not necessarily required, partition plates 22 are sometimes set for dividing the zones efficiently.

The combustion gas inside the furnace is the result of combustion of mixture of the fuel and air from burners 14 arranged at the furnace side walls from the reducing zone 19 to the heating zone 18 and the mostly carbon monoxide gas generated from the green pellets. This combustion gas flows from the reducing zone 19 toward the heating zone 18. Next, the gas is discharged from the exhaust gas outlet duct 2 at the ceiling of the heating zone 18 to the outside of the rotary furnace 1.

First, in the reducing zone 19, it is preferable to maintain a reducing atmosphere sufficient for reducing the green pellets. The metal oxides covered by the reduction in the rotary hearth method include iron, nickel, chromium, lead, zinc, and manganese. From the reducibility of these metals, the reducing zone 19 has to have a temperature of at least 1200° C. and a molar ratio of carbon monoxide to carbon dioxide of at least 0.1. Under these conditions, reduction of the green pellets 16 proceeds rapidly.

Further, if the temperature is over 1200° C., even the organic matter and chlorine mixed in with the green pellets 16 are broken down into carbon monoxide, carbon dioxide, water vapor, hydrogen, and hydrogen chloride and the amount of generation of dioxins is relatively kept down.

Next, the combustion gas inside the furnace flows to the heating zone 18. Here, the green pellets 16 are heated to a temperature of about 1100° C., but are not reduced. The temperature of the combustion gas here is made 1100 to 1200° C. at the portion near the reducing zone 19 and made 800 to 1100° C. at the portion near the exhaust gas outlet duct 2. Further, the temperature at the portion of the exhaust gas outlet duct 2 connected with the waste heat boiler 3 is made 800° C. or higher. Further, since no reduction takes place in the heating zone 18, the atmosphere of the combustion gas can be low in reducibility.

Therefore, at least the portion close to the exhaust gas outlet duct 2 contains excessive oxygen and is preferably kept low concentration of carbon monoxide.

Note that in the present invention, the portion close to the exhaust gas outlet duct 2 of the heating zone 18 in the reducing furnace and the portion of the exhaust gas duct 2 connected with the waste heat boiler 3 are together called the "vicinity of the exhaust gas outlet duct".

As the composition of the combustion gas at the vicinity of the exhaust gas duct and at the exhaust gas duct 2, in order to keep the concentration of carbon monoxide not more than 200 ppm by volume ratio, the concentration of oxygen is made 0.5 vol % or more at the portion of the exhaust gas outlet duct 2 connected with the waste heat boiler 3. Part of the portion corresponding to the conditions described is included inside the rotary furnace 1 as well, however from the viewpoint of control of the composition of the combustion gas, it is preferably in the middle of the exhaust gas outlet duct 2. Further, in the example of FIG. 1, a waste heat boiler 3 reclaiming heat is connected to the exhaust gas outlet duct 2, however if it is possible to cool the gas rapidly, it is also possible to connect other types of gas cooler or heat reclaimer. Further, from the viewpoint of the problems in management of the combustion gas in the flue and safety and the further reduction of dioxins, the concentration of carbon monoxide is more preferably reduced to not more than 60 ppm by volume ratio. Further, in addition to these conditions, from the viewpoint of improvement of mixing of the gases, if making the state of flow of the exhaust gas a well developed state of turbulence, it is possible to reduce the dioxins. Note that the method of development of turbulence will be explained later.

After then, the combustion gas is cooled to not higher than 300° C. by the waste heat boiler 3, water sprayer 4, and air preheating heat exchanger 5. The time for cooling is preferably not longer than 6 seconds. The cooled combustion gas passes through the duct 6 before dust collection, is cleaned of dust at the dust collector 7, is drawn in by the induction fan 8, then is dispersed from the smokestack 9 to the atmosphere. Note that the dust collector 7 used is a bag filter type. That is, the combustion gas of the rotary furnace is raised to 800° C. or hither and made to completely burn at least at one of the inside of the exhaust gas outlet duct and the vicinity of the exhaust gas outlet duct, then is rapidly cooled and cleaned of dust so as to suppress the generation of dioxins and prevent the deposition of dust.

The inventors investigated the operating conditions for suppressing the generation of dioxins in the combustion gas based on the operating characteristics of a rotary furnace. For this purpose, they conducted several experiments and drew the conclusion that it is sufficient to treat the combustion gas under the above operating conditions. Note that the content of the experiments will be explained in detail below.

The inventors found that to suppress the generation of dioxins, control of the temperature and gas compositions is important during treating the combustion gas from the heating zone 18 of the rotary furnace on. Dioxins are generated in large amounts in a state of incomplete combustion at an ambient temperature of 300 to 600° C. That is, several complicated organic molecules in the incompletely combusted gas react with chlorine to form dioxins at 300 to 600° C. Therefore, to eliminate the presence of complicated organic molecules such as benzene in this temperature range, the combustion gas in the reducing zone 19 which had contained large amounts of carbon monoxide is made to completely burn at a high temperature of 800° C. or higher at the portion from the heating zone 18 to the exhaust gas outlet duct 12, that is, inside the exhaust gas duct 2 and the vicinity of the exhaust gas duct.

Figure 4:
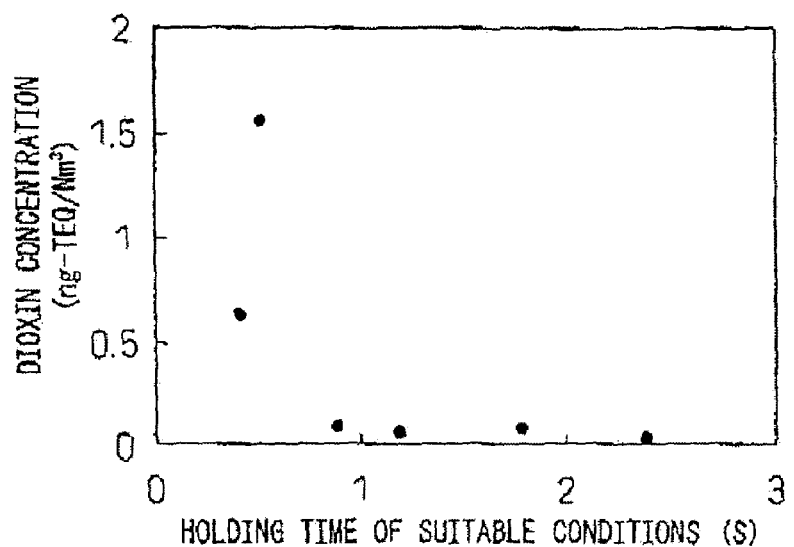
FIG. 4 is a view of the relationship between the holding time of a suitable combustion gas state and the concentration of dioxins in the combustion gas.

Further, if trying to completely burn the gas at a high temperature, the combustion gas is preferably mixed well in a state of excess oxygen. Therefore, the inventors studied the conditions of combustion gas under turbulent state to prevent the generation of dioxins since giving sufficiently well developed turbulence to the combustion gas would be an effective means for mixing the gas. FIG. 4 shows the results of the experiments. FIG. 4 shows the suitable conditions, that is, the relationship between the holding time where the temperature of the combustion gas is 800° C. or higher and the concentration of carbon monoxide is 200 ppm or less by volume ratio in the state of turbulence and the concentration of dioxins in the exhaust gas. As shown in FIG. 4, if the time when the conditions for suppression of dioxins are met, that is, the temperature of the combustion gas is more than 800° C. or higher and the concentration of carbon monoxide is 200 ppm or less in volume ratio, is 0.9 second or longer, the concentration of dioxins is a good one of 0.1 ng-TEQ/Nm3 or less. That is, it was learned that if sufficiently developing turbulence and simultaneously continuing the suitable state of combustion gas for 0.9 second, the above complicated organic molecules are no longer present and the conditions for suppression of the generation of dioxins can be satisfied.

To create suitable turbulence for mixing combustion gas, it is sufficient to make the indicator for evaluation of the state of flow in fluid dynamics, that is, the Reynolds number, larger. In general, when the Reynolds number exceeds 2300, the flow becomes turbulent. However, in the present invention, a good state for mixing the combustion gas, that is, sufficiently well developed turbulence, is necessary, so a larger Reynolds number is preferred. In experiments by the inventors, it was found that under a state of turbulence with a Reynolds number of 30,000 or larger, a uniform state of combustion gas, which is aimed at, is obtained. Therefore, a condition of the present invention is that the combustion gas have a temperature of 800° C. or higher and have a Reynolds number of 30,000 or larger at the portion where the concentration of the carbon monoxide is 200 ppm or less by volume ratio.

Further, to reduce the dioxins more, a lower concentration of carbon monoxide and a higher Reynolds number are sought. The inventors investigated and as result found that to make the concentration of dioxins in the exhaust gas a better state of 0.06 ng-TEQ/Nm$^3$ or lower, the concentration of carbon monoxide is preferably made a volume ratio of 60 ppm or less and a Reynolds number of 50,000 or larger. In this state, the state of mixing is extremely good, so a sufficient effect is given even if the time of continuation of this state is 0.6 second. If this condition is maintained, an extremely good result of the concentration of the dioxins in the exhaust gas being 0.02 to 0.06 ng-TEQ/Nm$^3$ is obtained.

Note that the Reynolds number is a dimensionless number and is obtained by dividing the product of the gas density, gas flow rate, and representative length by the gas viscosity. The Reynolds number is an indicator expressing the state of flow. When it is over 2300, the higher the Reynolds number, the more turbulent the flow. The representative length in calculation of the Reynolds number in the present invention used is the width of the hearth 12 or the diameter of the exhaust gas outlet duct 2. At the temperature of the combustion gas under the conditions of the present invention, that is, 800 to 1200° C., the density of the combustion gas is about 0.25 to 0.4 kg/m$^3$ and the viscosity is 4×10−5 to 6×10−5 kg/ms. Therefore, if the product of the diameter of the exhaust gas outlet duct 2 or the width of the hearth 12 and the flow rate of the combustion gas is 7.2 m$^2$/sec or more, the Reynolds number becomes 30,000 or larger. Further, if the product of the diameter of the exhaust gas outlet duct 2 or width of the hearth 12 and the flow rate of the combustion gas is 12 m$^2$/sec or more, the Reynolds number becomes more than 50,000. As explained above, to obtain the Reynolds number, the method of controlling the gas flow rate considering the width of the hearth and the diameter of the outlet duct is effective.

Note that needless to say, after this state is realized, the concentration of carbon monoxide is kept from increasing again.

Figure 5:
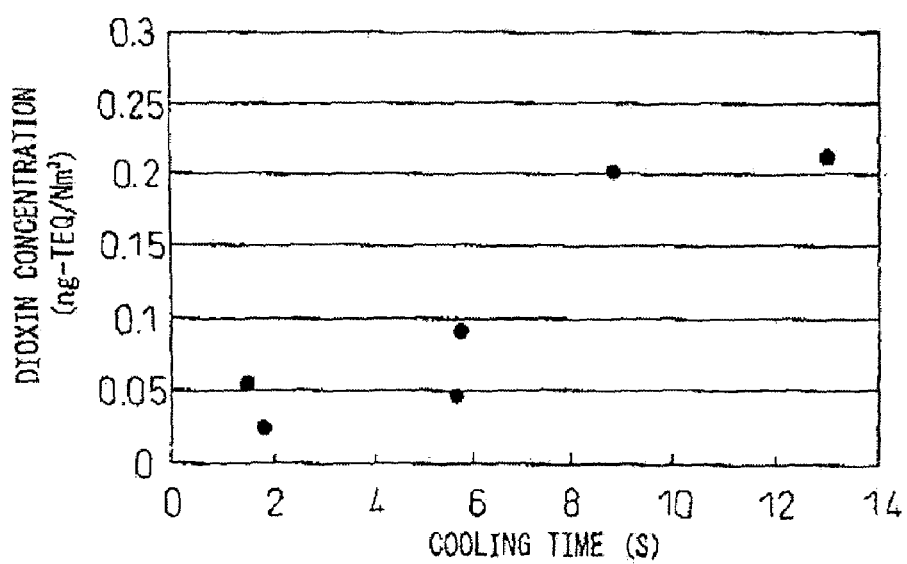
FIG. 5 is a view of the relationship between the time for cooling combustion exhaust gas from 800° C. to 300° C. and the concentration of dioxins in the combustion exhaust gas.

Next, it is important to cool the combustion gas from 800° C. to 300° C. rapidly. The objective is to shorten the time when the gas is in the temperature band of 300 to 600° C. where dioxins are resynthesized. Therefore, the inventors analyzed the time preferred for cooling. FIG. 5 shows the results of experiments. If the cooling time is over 6 seconds, the concentration of dioxins becomes more than 0.1 ng-TEQ/Nm$^3$. That is, it is important that the cooling time from 800° C. to 300° C. be made not longer than 6 seconds. Therefore, it is important that the inside volume of the cooling portion from 800° C. to 300° C. of the exhaust gas treatment apparatus be not more than 6 times the amount of flow of combustion gas per second.

If this cooling speed is kept, the combustion gas can be cooled by any method. In the example of FIG. 1, use was made of a combination of a waste heat boiler, water sprayer, and air preheating heat exchanger (heat exchanger between combustion gas and air). This method is an optimal method for reclaiming waste heat to the maximum and accurately controlling the temperature of the combustion gas. If simplifying the facility, however, it is also possible to omit the waste heat boiler and provide just a combination of a water sprayer and air preheater. In this case, the amount of waste heat reclaimed becomes about one-half that of the facility shown in FIG. 1. Further, when not reclaiming waste heat at all, it is also possible to cool the combustion gas to 300° C. or lower by just a water sprayer.

In this way, for efficient cooling, it is preferable to prevent deposition of dust on the cooler or the heat reclaimer (heat exchanger) of the exhaust gas treatment apparatus. As explained below in detail, it is preferable to make the total number of moles A of the zinc and lead, the total number of moles B of the sodium and potassium, and the total number of moles C of the chlorine and fluorine contained in the dust of the combustion gas generated in the furnace satisfy the relationship of $(C-B)A<0.36$ so as to prevent a decrease in the heat exchange and cooling efficiencies due to deposition on the cooler or heat reclaimer (heat exchanger) and the narrowing of the exhaust gas passage and clogging of flow due to deposition of dust in the duct. In addition, it is preferable to make the content of the compounds of alkali metals (sodium or potassium) and halogen elements (chlorine or fluorine) contained in the dust of the gas generated in the furnace 35 mass % or less so as to suppress the deposition of dust. Further, preferably by cooling the temperature of the gas generated in the furnace from more 800° C. or higher to 550° C. or lower within 5 seconds, it is possible to suppress the deposition of dust on the exhaust gas treatment apparatus and effectively suppress a decrease in the cooling efficiency.

However to suppress the generation of dioxins, the exhaust gas is rapidly cooled in the exhaust gas treatment apparatus, and at this time, heat exchange and the reclamation of heat are extremely important from the viewpoint of improving the heat efficiency in the operation.

However as explained above, due to the various problems arising due to the large amount of dust contained in this high temperature exhaust gas stick to the heat storage boiler, air preheating type heat exchanger, or ether heat reclaimer or cooler in the exhaust gas treatment apparatus, this is not efficient. These problems give an effect not only on the heat reclamation efficiency, but also the cooling efficiency of the exhaust gas for suppressing dioxins. The inventors further studied these points.

The combustion exhaust gas includes as dust components carried-over feedstock such as unreduced iron oxide etc., substances which easily vaporize at a high temperature such as alkali metals and halogen elements, and metals such as zinc, lead, and others which vaporize after being reduced. Among these substances, alkali halogen salts and zinc chloride or lead chloride themselves have melting points of 700 to 900° C. However, the inventors discovered that if the ratio of the alkali halogen salts and zinc chloride and lead chloride in the dust in the exhaust gas rises, these substances melt together and lower the melting point to 550 to 600° C. Further, they discovered that the dust with these conditions easily deposits in the path of the exhaust gas, that is, the passage of the exhaust gas from the exhaust gas duct of the furnace through the exhaust gas treatment apparatus to the atmosphere.

The clumps of the dust deposited in the path of the exhaust gas were analyzed. As a result, it was discovered that when the amount of chlorides and fluorides increases, these components in the dust stick at a temperature of 450 to 600° C. or higher and in particular when the ratio of the halides of zinc and lead to oxides of zinc and lead rises, the deposition becomes intense. Further, the inventors investigated the deposition of dust at the temperature of 550° C. where the heat exchanger etc. operated normally. As the result of the investigation, it was discovered that if the ratio of the halides of zinc and lead in the dust is 18% or less, converted to moles, with respect to the total of the oxides and halides of zinc and lead, the stickiness is relatively weak and the dust can be easily removed. Even under this condition, however, it was learned that when the mass ratio of alkali halogen salts, that is, compounds of alkali metals (sodium or potassium) and halogen elements (chlorine or fluorine) exceeds 35% of the mass of the dust as a whole, the deposition increased somewhat. Therefore, the percentage of compounds of alkali metals and halogen elements contained in the dust was made not more than 35 mass %.

Due to this, in the present invention, the ratio of the elements in the dust is controlled so that the halides of the zinc and lead in the dust becomes not more than 22% in molar ratio with respect to the oxides of zinc and lead. The molar ratio of the zinc, lead, sodium, potassium chloride and fluorine in the dust is controlled.

The control of the molar ratio is that the number of moles of halogen elements not fully reacting with alkaline, that is, (number of moles of chlorine+number of moles of fluorine)−(number of moles of sodium+number of moles of potassium), is made not more than 18% of the total number of moles of zinc and number of moles of lead. Note that zinc and lead form bivalent anions, so halogen elements, which are monovalent cations, are corrected by ion value. As the indicator for operation, [(number of moles of chlorine+number of moles of fluorine)−(number of moles of sodium+number of moles of potassium)]/(number of moles of zinc+number of moles of lead); (indicator 1) is used. In actual operation, the condition is expressed as indicator 1 <0.36. That is, when the total number of moles of zinc and lead contained in the dust is A, the total number of moles of sodium and potassium is B, and the total number of moles of chlorine and fluorine is c, $(C-B)/A<0.36$.

To control the ingredients of the dust accurately, it is necessary to control the ingredients of the feedstock. In the rotary hearth method, the rate of transition of the zinc and lead from the feedstock to the exhaust gas is at least 90%, the rate of transition of the alkali metals is about 70%, and the rate of transition of the halogen elements is about 80%. The ratios of the zinc, lead, alkali metals, and halogen elements in the feedstock are determined considering these transition rates. If expressing this by a formula, the result is [0.8 (number of moles of chlorine+number of moles of fluorine)−0.7 (number of moles of sodium+number of moles of potassium)]/[0.9 to 1.0 (number of moles of zinc+number of moles of lead)], so the furnace is operated using the simple formula [0.8 (number of moles of chlorine+number of moles of fluorine)−0.7 (number of moles of sodium+number of moles of potassium)]/(number of moles of zinc+number of moles of lead); (indicator 2) as an indicator of control of mixing of the feedstock. In actual operation, the condition is expressed as indicator 2 <0.36. That is, when the total number of moles of zinc and lead contained in the feedstock is A, the total number of moles of sodium and potassium is B', and the total number of moles of chlorine and fluorine is C', $(0.8C'-0.7B')/A'<0.36$.

To control the ingredients of the dust accurately, it is necessary to control the ingredients of the feedstock. In the rotary hearth method, the rate of transition of the zinc and lead from the feedstock to the exhaust gas is at least 90%, the rate of transition of the alkali metals is about 70%, and the rate of transition of the halogen elements is about 80%. The ratios of the zinc, lead, alkali metals, and halogen elements in the feedstock are determined considering these transition rates. If expressing this by a formula, the result is [0.8 (number of moles of chlorine+number of moles of fluorine)−0.7 (number of moles of sodium+number of moles of chlorine and fluorine is c, (C−B)/A<0.36.

Exhaust gas containing dust adjusted under these conditions is introduced to the exhaust gas treatment apparatus from the exhaust gas outlet duct 2. The temperature of the exhaust gas at this portion is made 800° C. or higher. If it is lower than 800° C., the chlorides and fluorides that enter the exhaust gas outlet duct 2 immediately precipitate and cause clogging near the inlet of the exhaust gas outlet duct 2. Further, as explained above, the temperature is made 800° C. or higher from the viewpoint of suppression of the generation of dioxins.

Next, the exhaust gas is introduced into the waste heat boiler 3 where the heat is reclaimed, then the exhaust gas is rapidly cooled to 550° C. or lower. If the temperature of the exhaust gas at the outlet of the waste heat boiler 3 becomes higher than 550° C. the exhaust gas is further cooled by the water spray cooler 4 to drop the temperature of the gas to 550° C. or lower. It is important to rapidly cool the exhaust gas from the waste heat boiler 3 to the water spray cooler 4 and shorten the time of the chlorides and fluorides being in the fused state. The inventors found that with the dust shown in the present invention, no serious deposition of dust occurred at the rapid cooling portion if reducing the temperature to 550° C. or lower within 5 seconds. Therefore, performing the cooling treatment as a whole by a water spray type gas cooler etc. is also effective.

The exhaust gas is further heat exchanged with air to reclaim the heat and cooled to not higher than 300° C., preferably about 200° C. Note that as mentioned above, from the viewpoint of suppressing resynthesis of dioxides, the cooling from 800° C. to not higher than 300° C. is preferably performed within 6 seconds. The gas temperature at the inlet part of the heat exchanger 5 is an important factor in the operation. That is, even with the dust composition of the scope of the present invention, if the temperature of the exhaust gas in the heat exchanger is too high, the sodium chloride, zinc chloride, etc. which did not finish solidifying deposits on the metal surfaces of the heat exchanger in a liquid state and cause the problem of blockage or metal corrosion. To prevent fouling of the heat transmission surfaces due to deposition of dust so as to reclaim waste heat efficiently and to prevent deposition of the dust, it is preferable to install a dust remover at the heat exchanger 5. There are various types of dust removers. Among them, generally used are a soot blow type which blows high pressure gas or steam and the impact type. The type of the heat exchanger is also preferable for prevention of the deposition of dust. A heat exchanger resistant to the deposition of dust is of a type passing air inside the tubes and exhaust gas outside the tubes to remove dust by soot blowing outside of the tubes or a type provided with a large number of parallel plates through which air and exhaust gas alternately flow and removing the deposited dust by a scraper.

The air heated by the heat exchange at this time is used as air for combustion in the rotary furnace 1 or hot air for predrying of the pellets.

The thus heat exchanged and cooled combustion exhaust gas is then passed through a duct 6 before the dust collector and cleaned of dust by the dust collector 7.

The dust collector 7 preferably is of a bag filter type not resynthesizing dioxins inside it. A "bag filter" is a device having a large number of filter cloths comprised of cloths with fine intervals between fibers formed into bag shapes and removes dust by passing gas containing dust through the filter cloths. The operating temperature of the bag filter is preferably at least 150° C. The reason is that if below 150° C., the temperature drops below the temperature of acid condensation and the facility is easily corroded. Further, in view of the problem of the heat resistance of the filter cloths, a temperature of not higher than 250° C. is preferable. With a rotary hearth, when reducing the metal oxide, oxides or chlorides of zinc, lead, alkali metals, etc. are exhausted into the combustion gas. These are submicron sized powders. With a cyclone etc., sufficient dust collection is not possible. Further, an electric dust collector has an insufficient dust collecting capability and induces resynthesizing reaction of dioxins inside it, so is not suitable for this process. A bag filter type dust collector is the best.

However, when cooling a large part of the sensible heat of the combustion gas by spraying water, the concentration of water vapor in the combustion gas becomes too high and a wetting at the bag filter arises, so a wet type dust collector is preferable. In particular, when the moisture in the combustion gas exceeds 30 mass %, the bag filter becomes extremely wet. Due to this, clogging and corrosion of the filter occur. To keep the moisture in the combustion gas not exceeding 30 mass %, it is necessary to make the amount of water added during the spraying not more than 400 kg per 1 Nm$^3$ of combustion gas. When spraying more than this amount, a venturi scrubber or other wet type dust collector is used.

Finally, the combustion exhaust gas after removal of the dust was discharged into the atmosphere from the smokestack 9 by the drive force of an induction fan 8.

As explained above, by operating the reducing furnace of a rotary hearth method by the method of the present invention, it is possible to keep the production of dioxins to a minimum and operate in a manner not causing much environmental pollution, it is possible to suppress the deposition of dust on the exhaust gas treatment apparatus and efficiently exchange heat and cool, and it is possible to realize an operation with a high heat efficiency, even when reducing metal using byproducts in the metal industry as a feedstock.

EXAMPLES

Example 1 to Example 3 and Comparative Example 1

Using the reducing furnace of the rotary hearth method described in FIG. 1, powder coke was mixed in fine iron ore, electric arc furnace dust, and particulate rolling scale to produce 10 to 20 mm green pellets. They were reduced in the rotary furnace. The rotary furnace had a center diameter of the hearth of 17 m and a hearth width of 4 m and had the capacity to produce 15 tons/h of reduced iron. The length of the reducing zone 19 of this rotating furnace was 35 m, while the length of the heating zone 18 was 18 m. The results of operation by this facility are shown in Table 1. Further, the combustion gas was generated at a rate of 27,000 to 30,000 Nm$^3$/h in Examples 1 and 2 and the comparative example, while was 17,000 Nm$^3$/h in Example 3.

In Example 1, the temperature of the reducing zone of the rotary furnace was made 1270° C. and the molar ratio of carbon monoxide to carbon dioxide was made 0.55. The green pellets were reduced in the reducing zone 19 for 8 minutes. This combustion gas flowed to the heating zone 18 where it was gradually cooled. When it reached the 7 m point to the exhaust gas outlet duct, the combustion gas was 1030° C., the concentration of carbon monoxide was 88 ppm by volume ratio, and the concentration of oxygen was 1.1 vol %. The temperature of the combustion gas at the inside of the exhaust gas outlet duct 2 was 980° C., the concentration of carbon monoxide was 69 ppm by volume ratio, and the concentration of oxygen was 1.3 vol %.

The flow rate of the combustion gas inside the furnace at a portion 5 m to the exhaust gas outlet duct 2 was 5.5 m/sec and inside the exhaust gas outlet duct 2 of a length of 6 m was 6.1 m/sec. The width of the hearth 12 at the heating zone inside the furnace was 4 m, the product of the hearth width and combustion gas flow rate was 22 $m^2$/sec, and the Reynolds number was 100,000. The diameter of the exhaust gas outlet duct 2 was 2.4 m, the product of the duct diameter and the combustion gas flow rate was 14.6 $m^2$/sec, and the Reynolds number was 70,000. Therefore, the time during which the conditions of the temperature and ingredients of the combustion gas of the present invention were satisfied was 0.9 second inside the heating zone in the furnace, and it was 1.0 second inside the exhaust gas outlet duct 2. The total was 1.9 seconds.

Further, the combustion gas was cooled from 980° C. to 210° C. over 5.7 seconds in the interval from the waste heat boiler 3 to the air preheater 5. Next, the combustion exhaust gas was cleaned of the dust by the bag filter type collector 7 and discharged into the atmosphere. The concentration of dioxins in the combustion exhaust gas at that time was 0.05 ng-TEQ/$Nm^3$, that is, a small load on the environment.

Example 2 shows the results of operation under even better conditions. The temperature of the combustion gas of the exhaust gas outlet duct 2 was 1105° C., while the concentration of carbon monoxide was 45 ppm in volume ratio. The Reynolds number of the exhaust gas outlet duct 2 was 72,000. The time while the combustion gas was 800° C. or higher was 0.8 second or within the conditions of the present invention. Further, the time for cooling from 800° C. to 300° C. was 4.7 seconds. As a result, the concentration of the dioxins in the combustion gas was an extremely good 0.02 ng-TEQ/$Nm^3$.

Example 3 shows the results of operation under conditions with a smaller Reynolds number. In this operation, the conditions were that of a reduced reducing speed of the pellets and low flow rate of the combustion gas. In the furnace, the concentration of carbon monoxide of the combustion gas was not more than 300 ppm in volume ratio and the combustion gas was treated as to give 130 ppm of carbon monoxide concentration at the inlet of the exhaust gas outlet duct 2. In this operation, the Reynolds number of the exhaust gas outlet duct 2 was 42,000. The temperature of this combustion gas was 910° C. and the time it was above 800° C. was 1.4 seconds or within the conditions of the present invention. Further, the time for cooling from 800° C. to 300° C. was 4.9 seconds. As a result, the concentration of dioxins in the combustion gas was somewhat high, but a good 0.101 ng-TEQ/$Nm^3$. The reduction rate of the pellets in the operations of these examples was a good 85% or so, on the other hand, in the comparative example, though green pellets of the same feedstock as the examples were reduced by the above rotary furnace 1, the concentration of dioxins in the combustion gas was high since the operating conditions of the present invention were not performed. In the comparative example, the temperature of the reducing zone and the ingredients of the combustion gas were similar to those of Example 1, but the temperature of the heating zone and the ingredients of the combustion gas were different. Among the conditions, only the Reynolds number was a high 60,000. In the heating zone, however, the temperature of the combustion gas was 760° C. at the minimum. Further, the atmosphere was oxygen deficient, the concentration of oxygen was about 0 vol %, and the concentration of carbon monoxide was 800 ppm by volume ratio. The concentration of carbon monoxide was 500 ppm even inside the exhaust gas outlet duct 2.

As a result, the concentration of dioxins in the combustion gas at the smokestack 9 was a relatively high 0.52 ng-TEQ/$Nm^3$. That is, in the comparative example, it was not possible to suitably control the temperature and ingredients of the combustion gas, so it was not possible to reduce the generation of dioxins.

TABLE 1

| | | Ex. 1 | Ex. 2 | Ex. 3 | Comp. Ex. 1 |
|---|---|---|---|---|---|
| Reducing zone | Temperature | 1270° C. | 1300° C. | 1280° C. | 1270° C. |
| | $CO/CO_2$ ratio (molar ratio) | 0.55 | 0.41 | 0.45 | 0.55 |
| Exhaust gas outlet duct vicinity | Temperature | 980° C. or higher | 1150° C. | 910° C. | 780° C. |
| | CO concentration (vol %) | 69 to 88 ppm | 45 ppm | 135 ppm | 500 ppm |
| | Reynolds number | 70,000 or larger | 72,000 | 42,000 | 60,000 |
| | Holding time | 1.9 sec. | 0.8 sec. | 1.5 sec. | — |
| | Subsequent cooling time (800° C. → 300° C.) | 5.7 sec. or shorter | 4.7 sec. or shorter | 4.9 sec. | — |
| Pellet reduction rate | | 85% | 84% | 87% | 83% |
| concentration of dioxins in exhaust gas (ng-TEQ/$Nm^3$) | | 0.05 | 0.02 | 0.101 | 0.52 |

Example 4 to Example 6 and Comparative Example 2

FIG. 1 shows an exhaust gas treatment facility of a reducing furnace using a rotary hearth used in Example 4 to Example 6 and Comparative Example 2 of this method of operation of the present invention. This reducing furnace reduces the green pellets of the feedstock at a rate of 18 tons per hour. A 1100° C. exhaust gas is generated at a rate of 45,000 Nm³/h. Table 2 shows the operating conditions and results of examples and a comparative example.

Example 4 is an example of an operation using iron ore and converter dust as iron sources and fine coke as a reducing agent. This feedstock has relatively little impurities. The indicator 2 of the feedstock ingredient was 0.18, that is, within the range of the present invention. As a result the indicator 1 of the dust ingredient was also 0.17 and the ratio of the alkali halogen salts was a low 20 mass %. The exhaust gas treatment conditions were that an exhaust gas temperature at the inlet of the exhaust gas outlet duct 2 was of a high 970° C., and the temperature of the inlet of the heat exchanger 5 was a low 480° C. As a result, there was no deposition of dust in the exhaust gas treatment apparatus at all.

Next, Example 5 is an example of operation using blast furnace gas dust with a relatively large amount of impurities. While the amount of impurities was large, the indicator 2 of the feedstock ingredients was 0.16 or substantially the same as in Example 4. As a result, the indicator 1 of the dust ingredients was 0.13. Compared with Example 1, since the feedstock contained lime, the conditions became ones where halogens easily remained in the reduced product. Compared with the indicator 2, it is believed that the indicator 1 became smaller. The ratio of the alkali halogen salts was also a low 21 mass %. In this operation as well the exhaust gas treatment conditions were that an exhaust gas temperature at the inlet of the exhaust gas outlet duct 2 was of a high 1000° C. and an exhaust gas temperature at the inlet of the heat exchanger 5 was of a low 460° C. As a result there was no deposition of dust in the exhaust gas treatment system at all.

An Example 6 has ingredients of the feedstock and dust within the range of the present invention. While this follows a method of the present invention, this is the result of operation under conditions where the exhaust gas temperature of the exhaust gas treatment apparatus is not good. Note that the feedstock used was the same as in Example 5. The indicator 1 and indicator 2 were the same as in Example 5. However, the exhaust gas temperature at the inlet of the exhaust gas outlet duct 2 was a low 760° C., while the exhaust gas temperature at the inlet of the heat exchanger was a high 570° C. As a result, the problem arose of slight deposition of the dust in the exhaust gas treatment apparatus. When inspected after operation for three months, a deposit was observed at the inlet of the exhaust gas outlet duct 2. Further, the inlet of the heat exchanger 5 gradually became clogged. Thus cleaning would be preferred in two months.

The results of operation in adjustment of the feedstock, exhaust gas temperature, and dust control are shown in Comparative Example 2. In Comparative Example 1, since large amounts of chlorine and other feedstock were used, the indicator 2 of the ingredients was 0.48. As a result, the indicator 1 of the dust was 0.51. Further, the ratio of the alkali halogen salts was also a high 30 mass %. As a result, while the temperature condition of the exhaust gas was good, there was a deposit at the inlet of the exhaust gas outlet duct 2 which should preferably be cleaned after one month. Further, the inlet of the heat exchanger 5 became clogged fast and operation no longer was possible after 2 weeks. In this way, when outside the conditions of the present invention, long term, stable operation should preferably not be continued.

On the other hand, by using the present invention, it was possible to continue stable operation for a long period and exchange heat well. Therefore it was possible to reduce metal oxides at a high energy efficiency and possible to reduce the cost of metal production greatly.

TABLE 2

| Ingredient | Ex. 4 Iron ore Converter dust fine coke | Ex. 5 Blast furnace gas dust Converter dust fine coke | Ex. 6 Blast furnace gas dust Converter dust fine coke | Comp. Ex. 2 Pickling sludge Converter dust fine coke |
|---|---|---|---|---|
| Feedstock | | | | |
| Zinc (mass %) | 0.44 | 1.11 | 1.11 | 0.88 |
| Lead (mass %) | 0.08 | 0.07 | 0.07 | 0.09 |
| Sodium (mass %) | 0.11 | 0.09 | 0.09 | 0.19 |
| Potassium (mass %) | 0.09 | 0.14 | 0.14 | 0.11 |
| Chlorine (mass %) | 0.11 | 0.19 | 0.19 | 0.47 |
| Fluorine (mass %) | 0.09 | 0.09 | 0.09 | 0.09 |
| Indicator 2 | 0.18 | 0.16 | 0.16 | 0.48 |
| Dust | | | | |
| Zinc (mass %) | 39 | 53 | 53 | 37 |
| Lead (mass %) | 3 | 4 | 4 | 4 |
| Sodium {mass %) | 4 | 4 | 4 | 6 |
| Potassium {mass %} | 5 | 5 | 5 | 4 |
| Chlorine (mass %) | 7 | 9 | 9 | 16 |
| Fluorine {mass %} | 4 | 3 | 3 | 4 |
| Indicator 1 | 0.17 | 0.13 | 0.13 | 0.51 |
| Alkali halogen salts (mass %) | 20 | 21 | 21 | 30 |
| Exhaust gas temperature | | | | |
| Exhaust gas introduction duct (° C.) | 970 | 1000 | 760 | 1000 |
| Heat exchanger inlet (° C.) | 480 | 460 | 570 | 460 |
| Exhaust gas introduction duct clogging | None | None | Some deposition | Large deposition |
| Heat exchanger inlet clogging | None | None | Clean after 2 months | Clogged in 2 weeks |

INDUSTRIAL APPLICABILITY

According to the present invention, in the operation of a reducing rotary hearth furnace or other firing reducing furnace, it is possible to suppress the production of dioxins in combustion exhaust gas to ½ to 1/10 that of the past. Further, it is possible to suppress blockage of the path of the exhaust gas in the exhaust gas treatment apparatus due to deposition of the dust, to reclaim waste heat from the high temperature exhaust gas efficiently, and to raise the heat efficiency of the firing reducing furnace. Due to this, it is possible to reduce dust, sludge, scale, and other by-products produced from the metal industry effectively, possible to perform the operation at a high operating rate, and possible to reduce the production costs of reduced metal.

What is claimed is:

1. A method for operating a reducing rotary hearth furnace, comprising the steps of:

(a) conforming a combustion gas which has been generated inside a rotary hearth reducing furnace to a temperature of at least 800° C. to be at least provided at one of:
  i. an internal portion of an exhaust gas outlet duct of the reducing furnace, and
  ii. a vicinity of the exhaust gas outlet duct;
(b) making a concentration of carbon monoxide in the combustion gas to be not more than 200 ppm by volume ratio by controlling a concentration of oxygen in the combustion gas at the portion of the exhaust gas outlet duct connected with the waste heat boiler to be not less than 0.5% by volume ratio;
(c) making the combustion gas to be in a well-developed turbulent state by controlling a gas flow rate considering a width of the hearth of the furnace or a diameter of the outlet duct; and
(d) rapidly cooling the combustion gas after step (c).

2. The method according to claim 1, wherein the combustion gas generated in the reducing furnace has a temperature within the furnace of at least 1200° C. and a molar ratio of carbon monoxide to carbon dioxide of at least 0.1.

3. The method according to claim 1, wherein the combustion gas is cooled from the temperature of at least 800° C. to not more than 300° C. within 6 seconds.

4. The method according to claim 3, wherein the combustion gas is cooled in an exhaust gas treatment apparatus using at least one of:
  i. air, and
  ii. at least one of a waste heat boiler, a water sprayer, and a heat exchanger with air alone or in combination.

5. The method according to claim 1, wherein a total number of moles (A) of zinc and lead, a total number of moles (B) of sodium and potassium, and a total number of moles (C) of chlorine and fluorine contained in a dust of the combustion gas generated in the reducing furnace satisfy the relationship of (C−B)/A<0.36.

6. The method according to claim 5, wherein the temperature of the combustion gas generated in the reducing furnace is cooled from at least 800° C. to 550° C. or lower within 5 seconds.

7. The method according to claim 1, wherein the percent content of compounds of sodium or potassium and chlorine or fluorine contained in a dust of the combustion gas generated in the reducing furnace is not more than 35 mass %.

8. The method according to claim 7, wherein the temperature of the combustion gas generated in the reducing furnace is cooled from at least 800° C. to 550° C. or lower within 5 seconds.

9. A method for operating a reducing rotary hearth furnace, comprising the steps of:
  (a) conforming a combustion gas generated in a reducing rotary hearth furnace to have a temperature of at least 800° C. for at least approximately 0.9 second to be at least provided at one of:
    i. an internal portion of an exhaust gas outlet duct of the reducing furnace, and
    ii. a vicinity of the exhaust gas outlet duct;
  (b) making a concentration of carbon monoxide of the combustion gas to be not more than 200 ppm by volume ratio by controlling a concentration of oxygen in the combustion gas at the portion of the exhaust gas outlet duct connected with the waste heat boiler to be not less than 0.5% by volume ratio;
  (c) making the combustion gas to be in a turbulent state of a Reynolds number of at least 30,000 by controlling the gas flow rate considering a width of the hearth of the furnace and a diameter of the outlet duct; and
  (d) rapidly cooling the combustion gas after step (c).

10. The method according to claim 9, wherein the combustion gas generated in the reducing furnace has a temperature within the furnace of at least 1200° C. and a molar ratio of carbon monoxide to carbon dioxide of at least 0.1.

11. The method according to claim 9, wherein the combustion gas is cooled from the temperature of at least 800° C. to not more than 300° C. within 6 seconds.

12. The method according to claim 11, wherein the combustion gas is cooled in an exhaust gas treatment apparatus using at least one of:
  i. air, and
  ii. at least one of a waste heat boiler, a water sprayer, and a heat exchanger with air alone or in combination.

13. The method according to claim 9, wherein a total number of moles (A) of zinc and lead, a total number of moles (B) of sodium and potassium, and a total number of moles (C) of chlorine and fluorine contained in a dust of the combustion gas generated in the reducing furnace satisfy the relationship of (C−B)/A<0.36.

14. The method according to claim 13, wherein the temperature of the combustion gas generated in the reducing furnace is cooled from at least 800° C. to 550° C. or lower within 5 seconds.

15. The method according to claim 9, wherein the percent content of compounds of sodium or potassium and chlorine or fluorine contained in a dust of the combustion gas generated in the reducing furnace is not more than 35 mass %.

16. The method according to claim 15, wherein the temperature of the combustion gas generated in the reducing furnace is cooled from at least 800° C. to 550° C. or lower within 5 seconds.

17. A method for operating a reducing rotary hearth furnace, comprising the steps of:
  (a) conforming a combustion gas generated in a rotary bed type reduction furnace to be at a temperature of at least 800° C. for at least approximately 0.6 second to be at least provided at one of:
    i. an internal portion of an exhaust gas outlet duct of the reducing furnace, and
    ii. a vicinity of the exhaust gas outlet duct;
  (b) making a concentration of carbon monoxide of the combustion gas to be not more than 60 ppm by volume ratio by controlling a concentration of oxygen in the combustion gas at the portion of the exhaust gas outlet duct connected with the waste heat boiler to be not less than 0.5% by volume ratio;
  (c) making the combustion gas to be in a turbulent state of a Reynolds number of at least approximately 50,000 by controlling the gas flow rate considering a width of the hearth of the furnace and a diameter of the outlet duct; and
  (d) rapidly cooling the combustion gas after step (c).

18. The method according to claim 17, wherein the combustion gas generated in the reducing furnace has a temperature within the furnace of at least 1200° C. and a molar ratio of carbon monoxide to carbon dioxide of at least 0.1.

19. The method according to claim 17, wherein the combustion gas is cooled from the temperature of at least 800° C. to not more than 300° C. within 6 seconds.

20. The method according to claim 19, wherein the combustion gas is cooled in an exhaust gas treatment apparatus using at least one of:

i. air, and ii. at least one of a waste heat boiler, a water sprayer, and a heat exchanger with air alone or in combination.

21. The method according to claim 17, wherein a total number of moles (A) of zinc and lead, a total number of moles (B) of sodium and potassium, and a total number of moles (C) of chlorine and fluorine contained in a dust of the combustion gas generated in the reducing furnace satisfy the relationship of (C−B)/A<0.36.

22. The method according to claim 21, wherein the temperature of the combustion gas generated in the reducing furnace is cooled from at least 800° C. to 550° C. or lower within 5 seconds.

23. The method according to claim 17, wherein the percent content of compounds of sodium or potassium and chlorine or fluorine contained in a dust of the combustion gas generated in the reducing furnace is not more than 35 mass %.

24. The method according to claim 23, wherein the temperature of the combustion gas generated in the reducing furnace is cooled from at least 800° C. to 550° C. or lower within 5 seconds.

25. A method for operating a reducing rotary furnace, comprising the step of:

cooling a combustion exhaust gas in a gas treatment apparatus which includes a preheating type heat exchanger that preheats air by a heat exchanging procedure, wherein the ingredients of the feedstock are controlled so that a total number of moles (A) of zinc and lead, a total number of moles (B) of sodium and potassium, and a total number of moles of (C) of chlorine and fluorine contained in a dust of the combustion gas generated in the gas treatment apparatus satisfy the relationship of (C−B)/A<0.36.

26. The method according to claim 25, wherein a content ratio of compounds of one of:

sodium, potassium and chlorine, and fluorine contained in the dust of the combustion gas generated in the gas treatment apparatus is not more than 35 mass %.

27. The method according to claim 25, wherein the gas treatment apparatus generates an exhaust gas associated with the combustion gas, wherein the exhaust gas provided at an inlet of an outlet duct of the gas treatment apparatus is at a temperature of at least 800° C., and wherein the exhaust gas provided at an inlet of an air preheating heat exchanger of the exhaust gas treatment apparatus is at a temperature of 550° C. or lower.

28. The method according to claim 27, further comprising the step of cooling the temperature of the exhaust gas from at least 800° C. to 550° C. or lower within 5 seconds.

29. A method for operating a reducing rotary hearth furnace so as to fire and reduce a feedstock obtained by shaping a powder containing a metal oxide and carbon, comprising the steps of:

(a) cooling a combustion exhaust gas in a rotary hearth reducing furnace having an exhaust gas treatment apparatus which includes at least an air preheating type heat exchanger, wherein a mixing ration of the feedstock is determined so that a total number of moles (A') of zinc and lead, a total number of moles (B') of sodium and potassium, and a total number of moles (C') of chlorine and fluorine in the feedstock satisfy the relationship of (0.8C'−0.7B')/A'<0.36;

(b) conforming a temperature of the exhaust gas provided at an exhaust gas outlet duct of the reducing furnace to be at least 800° C. or higher; and (c) conforming a temperature of the exhaust gas provided at an inlet of the air preheating type heat exchanger to be at least 550° C.

30. The method according to claim 29, further comprising the step of cleaning a dust from the cooled combustion gas generated in the reducing furnace using a bag filter of the exhaust gas treatment apparatus.

* * * * *